United States Patent [19]
Kozbelt

[11] 3,890,485
[45] June 17, 1975

[54] ELECTRIC HEATERS

[75] Inventor: Lloyd S. Kozbelt, Pittsburgh, Pa.

[73] Assignee: Emerson Electric Co., St. Louis, Mo.

[22] Filed: Mar. 29, 1974

[21] Appl. No.: 456,014

[52] U.S. Cl. ............... 219/523; 219/328; 219/494; 219/544; 338/241; 425/144
[51] Int. Cl. ......................... H05b 3/80; H05b 1/02
[58] Field of Search .......... 219/328, 331, 494, 523, 219/544; 338/238, 239, 240, 241, 273; 421/144

[56] References Cited
UNITED STATES PATENTS

| | | | |
|---|---|---|---|
| 2,831,951 | 4/1958 | Desloge | 338/241 |
| 3,080,543 | 3/1963 | Boggs | 338/273 |
| 3,340,382 | 9/1967 | Lennox | 219/544 |
| 3,499,189 | 3/1970 | Perras | 425/144 |
| 3,609,809 | 10/1971 | Slicker | 425/144 |
| 3,751,014 | 8/1973 | Waterloo | 425/144 X |
| 3,754,118 | 8/1973 | Booker | 219/523 |

*Primary Examiner*—Volodymyr Y. Mayewsky
*Attorney, Agent, or Firm*—Michael Williams

[57] ABSTRACT

A sheathed electrical heater, preferably of the cartridge type, having a built-in thermocouple with its heat sensing junction at the inner end of the heater. The invention provides a construction which may be manufactured without material departure from present practice.

5 Claims, 5 Drawing Figures

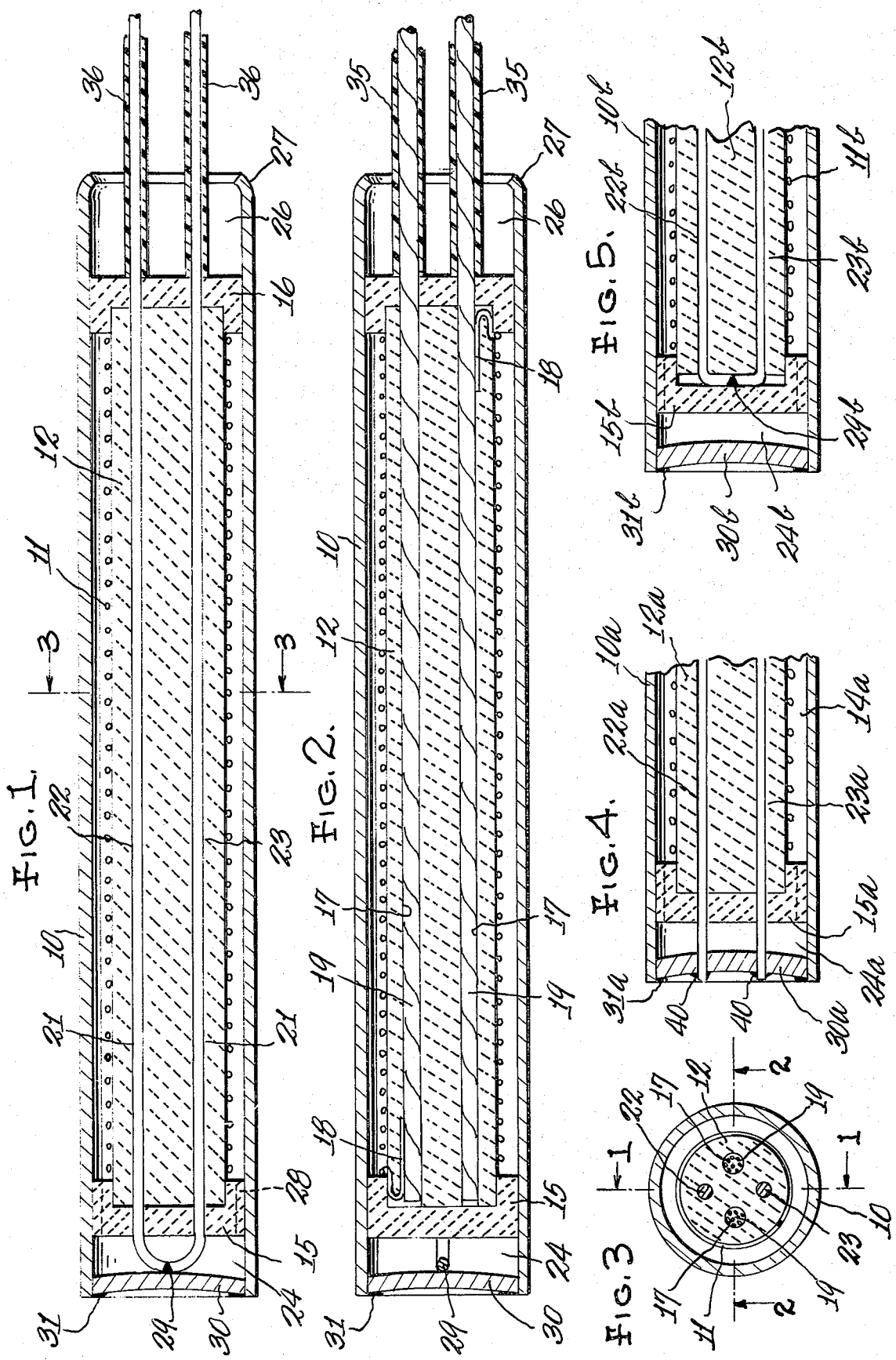

ELECTRIC HEATERS

BACKGROUND AND SUMMARY

The invention utilizes the general rule of thermocouples that whenever two wires of different materials are connected together at both ends, an electric current will be developed if the two junctures are not at the same temperature.

In the constructions disclosed herein, the heat sensing junction of the thermocouple is disposed at that end of the electric heater which is normally positioned innermost of the medium to be heated. In heating press platens or extrusion nozzles, for example, the heater fits snugly within a hole and it is preferred to measure the temperature at the innermost end of the heater. Likewise, in heating liquids and when the heater is disposed vertically, the inner (or now upper) end will be the first to be exposed when the liquid level drops to an undesirable low level.

My invention also provides a simplified method of manufacturing electric heaters with built-in thermocouples and therefor reduces the cost of manufacture.

Electric heaters embodying built-in thermocouples are known in the prior art but these measure heat at selected points along the sheath wall and therefore are reliable only if the temperature is to be measured at a selected point, or points on the sheath wall. Insofar as I am aware, the prior art devices are not adapted to measure temperatures at the inner end of the electric heater.

Briefly, my invention comprises a tubular metal sheath, an electric resistance element within the sheath and heating-conducting, electrical-insulating material spacing the resistance element from engagement with the inner wall of the sheath. The thermocouple wires extend longitudinally of the sheath and are also embedded within the insulating material. The heat sensing junction of the two thermocouple wires is disposed at the open inner end of the sheath, and such inner end is closed by a metal plug which, at the same time establishes heat transfer relation with the sensing junction of the thermocouple.

DESCRIPTION OF THE DRAWING

In the drawing accompanying this description and forming a part of this specification, there are shown for purpose, of illustration, several embodiments which my invention may assume, and in this drawing:

FIG. 1 is an enlarged, longitudinal sectional view through an electric heater, showing a presently preferred embodiment of my invention, this view corresponding to the line 1—1 of FIG. 3, FIG. 2 is a sectional view similar to FIG. 1, but corresponding to the line 2—2 of FIG. 1, FIG. 3 is a transverse sectional view corresponding to the line of 3—3 of FIG. 1, and FIGS. 4 and 5 are fragmentary longitudinal sectional views showing other embodiments of my invention.

DESCRIPTION OF THE PREFERRED EMBODIMENT

As in the usual electric heater construction, the embodiment disclosed in FIGS. 1 through 3 comprises a metal tubular sheath 10, open at both ends. A helically coiled resistance wire 11 is disposed axially within the sheath, and heat-conducting, electrically insulating material supports the resistor wire from engagement with the sheath.

In the manufacture of cartridge heaters particularly, it is customary to wind the resistor wire on a core 12 of refractory material, with the diameter of the core less than the inside diameter of the sheath to form an annular space 14. The core is supported between two centering bushings 15 and 16 which also space the core ends from respective opposite ends of the tubular sheath.

As seen in FIGS. 2 and 3, the core 12 has a pair of longitudinal openings 17, and opposite ends 18 of the coiled resistor wire 11 are inserted into the openings, one end 18 being inserted into one opening at one end of the core and the other end being inserted into the other opening at the opposite end of the core, as seen in FIG. 2. Conductor wires 19, preferably stranded, are then inserted into respective openings to electrically engage respective resistor wire ends. As seen in FIG. 2, both conductor wires 19 extend from the centering bushing 15, through the core openings, through openings in the centering bushing 16, and outwardly of the sheath, for connection to a source of electrical energy.

As seen in FIGS. 1 and 3, the core 12 is formed with another pair of longitudinal openings 21, and the thermocouple wires 22, 23 extend from a space 24 at the left hand end of the sheath (with reference to FIG. 1), through the openings in the centering bushing 15, through the core openings 21, through openings in the centering bushing 16, and outwardly of the right hand end of the sheath a considerable amount in unspliced manner for connection to a temperature gauge, such as a millivolt meter or potentiometer calibrated in temperature gradutions, and the latter connection would form the cold end junction of the thermocouple wires.

The wires 22,23 are preferably solid, at least for their lengths within the heater, and are formed of dissimilar materials in accordance with thermocouple theory. The wire 22, for example, may be a solid iron wire, whereas the wire 23, for example, may be a solid Constantan wire.

The centering bushing 15 is preferably molded ceramic while the bushing 16 is molded from H cement because of its better homogenization qualities whereby it will better seal against the inner wall of the sheath. A polyethylene bushing (not shown) is disposed in an end space 26, and the end of the sheath is turned in, as shown at 27, to lock this bushing in place.

The assembly thus formed may be disposed upright, with the left hand end of the sheath, as viewed in FIG. 1, upright. Grannlar refractory material is then introduced into the upper open end of the sheath, this material passing through peripheral openings 28 in the centering bushing 15 to fill the annular space 14, and the filling operation is accompanied with vibration of the sheath.

Thereafter, the ends of the theromocouple wires 22,23, in the space 24 at the left end of the sheath, as viewed in FIG. 1, are connected, preferably by a heli-arc weld, as shown at 29. This forms the temperature sensing junction of the thermocouple. The space 24 is then filled with grannular refractory material, but with the junction 29 exposed, and a metal end disc 30 is pressed into the sheath end so that its inner face engages the sensing junction 29. Preferably, an annular weld 31 is made between the periphery of the disc 30 and the sheath, to hermetically seal the sheath at this end.

The heater thus far produced is subjected to a side pressing or swaging action to reduce the diameter of the sheath and thereby compact the insulation material therein and make it a homogenous mass. It will be noted that the metal end disc 30 is canted inwardly of the sheath, so that swaging will cause it to bulge inwardly of the sheath and at all times remain firmly engaged with the sensing junction 29.

The polyethylene bushing is then burned out of the space 26 and insulating sleeves 35 are disposed over the terminal wires 19,19, and insulating sleeves 36 are disposed over the thermocouple wires 22,23, and the space 26 is then filled with an air set cement.

DESCRIPTION OF OTHER EMBODIMENTS

The embodiment of my invention shown in FIG. 4 is quite similar in construction to that heretofore described, and similar parts bear the same reference numeral, with the suffix *a* added. In this case, the thermocouple wires 22a and 23a are extended through openings in the metal end disc 30a and then clipped off substantially flush with the outer surface of such disc, and welded thereto by heli-arc welds 40.

In the embodiment shown in FIG. 5, similar parts bear the same reference numerals, with the suffix *b* added. In this case, the ends of the thermocouple wires 22b and 23b are twisted together and welded, at 29b, before the end of the core 12b is inserted into the end recess in centering bushing 15b.

I claim:
1. An electric heater, comprising:
   a tubular metal sheath,
   electrical-insulating, heat-conducting material transversely filling said sheath and extending for substantially the length thereof,
   a heating resistance wire extending longitudinally of said sheath and through said material,
   a pair of thermocouple wires of dissimilar metals extending longitudinally of said sheath and through said material in laterally spaced relation with respect to said resistance wire,
   said material electrically insulating said resistance wire and said thermocouple wires from each other and said sheath,
   terminal means extending from said resistance wire and outwardly of one end of said sheath for connection to a source of electricity for energizing said resistance wire to produce heat,
   said thermocouple wires having terminal portions extending outwardly of said sheath one end for connection to a temperature responsive device,
   said thermocouple wires being connected to each other at the opposite end of said sheath to form a heat sensing junction adjoining said sheath opposite end and be responsive to thermal conditions thereat, but being disposed within the transverse confines of said sheath opposite end for protection,
   a metal disc hermetically closing said opposite end of said sheath, the inner wall surface of said disc being disposed adjacent to said heat sensing junction, and,
   said thermocouple wires are connected to each other through said metal disc.
2. An electric heater, comprising:
   a tubular metal sheath,
   an electrical-insulating, heat-conducting ceramic core extending for a major portion of the length thereof and having two pairs of longitudinal openings through said sheath,
   means supporting said core centrally of said sheath,
   a helically coiled heating resistance wire extending longitudinally of said sheath adjacent said core and spaced inwardly from said metal sheath,
   a pair of thermocouple wires of dissimilar metals extending longitudinally of said core through the coil of said resistance wire and through one pair of said core openings,
   said core thereby electrically insulating said resistance wire and said thermocouple wires from each other and supporting said thermocouple and resistance wires in fixed spaced relation within said sheath,
   terminal means extending from said resistance wire through the other pair of said core openings and outwardly of one end of said sheath for connection to a source of electricity for energizing said resistance wire to produce heat,
   said thermocouple wires having terminal portions extending outwardly of said sheath one end and from said pair of core openings for connection to a temperature responsive device,
   said thermocouple wires being connected to each other at the opposite end of said sheath and longitudinally outwardly from said resistance wires to form a heat sensing junction adjoining said sheath opposite end and be responsive to ambient thermal conditions thereat, with said junction being disposed within the transverse confines of said sheath opposite end for protection, and,
   a metal closure disc hermetically sealing said sheath at said opposite end.
3. The construction according to claim 2 wherein the inner wall surface of said disc is in engagement with said sensing junction.
4. The construction according to claim 1 wherein the inner wall surface of said metal disc is in engagement with said sensing junction.
5. The construction according to claim 2 wherein said thermocouple wires are connected to said metal disc and are thereby electrically connected together.

* * * * *